United States Patent
Vasilevsky et al.

(10) Patent No.: US 8,116,612 B2
(45) Date of Patent: Feb. 14, 2012

(54) CENTRALIZED DIGITAL VIDEO RECORDING AND PLAYBACK SYSTEM ACCESSIBLE TO MULTIPLE REPRODUCTION AND CONTROL UNITS VIA A HOME AREA NETWORK

(75) Inventors: Alexander Vasilevsky, Westford, MA (US); Carlton J. Sparrell, Marblehead, MA (US); Sergio Parise, Westford, MA (US); John Watlington, Acton, MA (US); Peter A. Kaczowka, Townsend, MA (US)

(73) Assignee: Ucentric Systems, Inc., Maynard, MA (US)

( * ) Notice: Subject to any disclaimer, the term of this patent is extended or adjusted under 35 U.S.C. 154(b) by 2914 days.

(21) Appl. No.: 10/017,675

(22) Filed: Dec. 15, 2001

(65) Prior Publication Data

US 2003/0068155 A1      Apr. 10, 2003

Related U.S. Application Data

(60) Provisional application No. 60/327,627, filed on Oct. 5, 2001.

(51) Int. Cl.
*H04N 5/76* (2006.01)

(52) U.S. Cl. ......... 386/293; 386/291; 386/294; 386/323

(58) Field of Classification Search .................... 386/46, 386/95, 96, 125–126; 725/112, 38, 39, 40, 725/68–70, 86–88
See application file for complete search history.

(56) References Cited

U.S. PATENT DOCUMENTS

| | | | |
|---|---|---|---|
| 4,675,757 A * | 6/1987 | Block ............................ | 360/72.2 |
| 4,792,849 A | 12/1988 | McCalley et al. | |
| 5,177,618 A * | 1/1993 | Dunlap et al. .................. | 386/94 |
| 5,521,631 A | 5/1996 | Budow et al. | |
| 5,550,863 A * | 8/1996 | Yurt et al. ...................... | 375/240 |
| 5,808,662 A | 9/1998 | Kinney et al. | |
| 5,867,223 A | 2/1999 | Schindler et al. | |
| 5,928,327 A | 7/1999 | Wang et al. | |
| 5,945,988 A | 8/1999 | Williams et al. | |
| 6,177,963 B1 | 1/2001 | Foye et al. | |
| 6,233,389 B1 * | 5/2001 | Barton et al. .................... | 386/46 |
| 6,300,976 B1 * | 10/2001 | Fukuoka .................. | 348/231.99 |
| 6,799,283 B1 * | 9/2004 | Tamai et al. ..................... | 714/6 |
| 6,973,669 B2 * | 12/2005 | Daniels ......................... | 725/112 |
| 7,848,430 B2 * | 12/2010 | Valmiki et al. ........... | 375/240.24 |
| 2002/0059621 A1 * | 5/2002 | Thomas et al. ................. | 725/87 |
| 2002/0133821 A1 * | 9/2002 | Shteyn ............................ | 725/46 |
| 2002/0162109 A1 * | 10/2002 | Shteyn ............................ | 725/87 |
| 2005/0055717 A1 * | 3/2005 | Daniels ........................... | 725/58 |

FOREIGN PATENT DOCUMENTS

| | | |
|---|---|---|
| GB | 2251970 A | 7/1992 |
| WO | WO 00/58967 | 10/2000 |
| WO | WO0150290 A1 | 7/2001 |

* cited by examiner

*Primary Examiner* — Jamie Atala
(74) *Attorney, Agent, or Firm* — Brian G. Brannon

(57) ABSTRACT

A centralized Digital Video Recording (DVR) and reproduction system links several reproduction and control units (such as television receivers, etc.) and a centralized server via a home area network. This allows programming to be distributed throughout the premises, and novelly allows live-pause recording and playback to be effected from more than one reproduction and control unit in a seamless manner. For example, during a live-pause episode, a viewer can pause a program from one control and reproduction unit, and resume viewing the program from the same pause point at another control and reproduction unit on the premises. The present invention also allows a viewer to view multiple programs from the server on the same monitor using a multiple picture-in-picture display.

11 Claims, 2 Drawing Sheets

Figure 1:
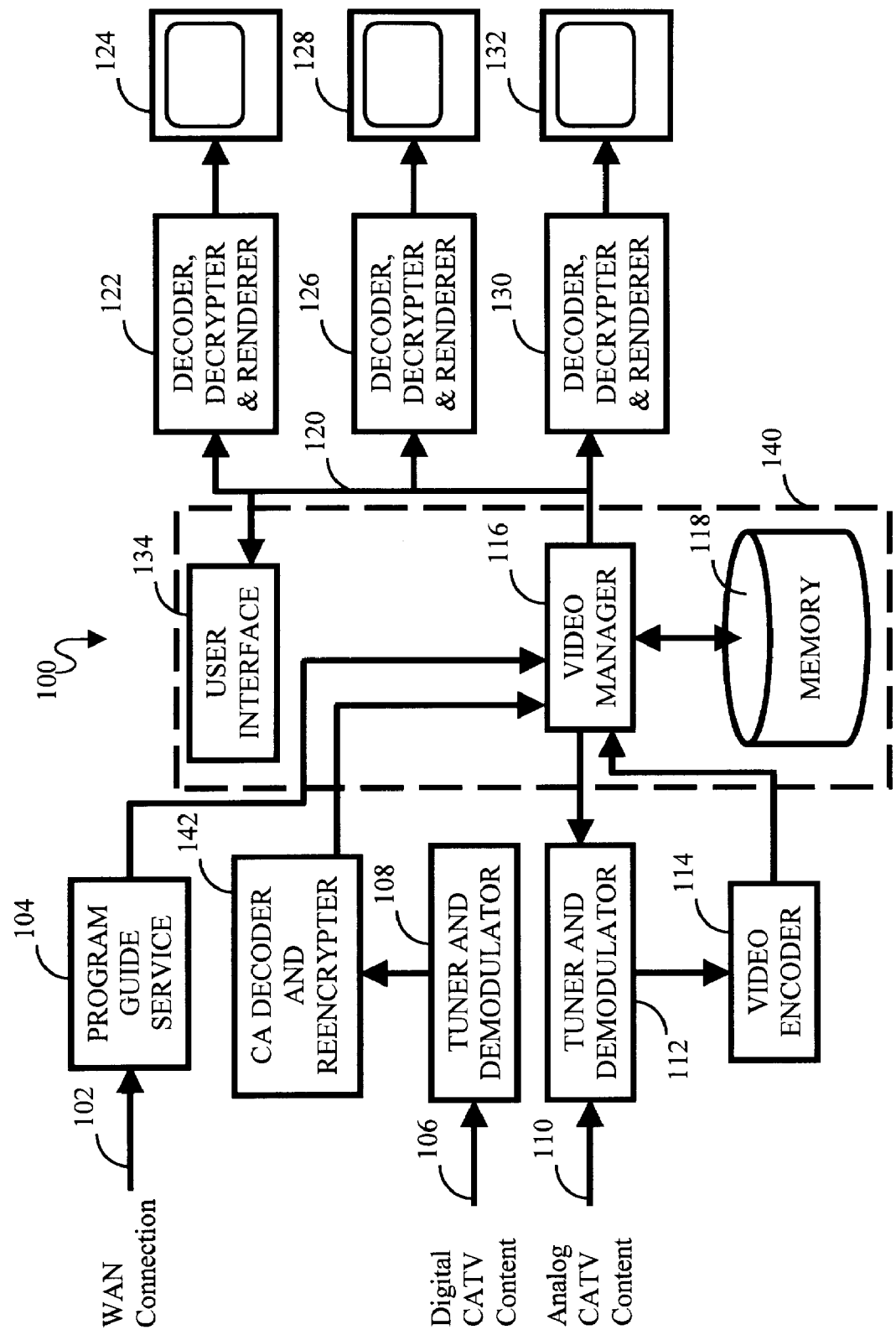

CENTRALIZED DIGITAL VIDEO RECORDING AND PLAYBACK SYSTEM ACCESSIBLE TO MULTIPLE REPRODUCTION AND CONTROL UNITS VIA A HOME AREA NETWORK

CROSS-REFERENCE TO RELATED APPLICATIONS

The present application for Letters Patent is based on Provisional Application Ser. No. 60/327,627 filed Oct. 5, 2001, entitled "Home Area Network Centralized Digital Video Recorder," hereby incorporated by reference. The present application also incorporates by reference, the following other applications: U.S. patent application Ser. No. 09/365,726 filed Aug. 3, 1999, entitled "Multi-Service In-Home Network With an Open Interface;" U.S. Provisional Application Ser. No. 60/193,813 filed Mar. 31, 2000, entitled "Home Area Network;" U.S. Provisional Application Ser. No. 60/313,209 filed Aug. 17, 2001, entitled "Delivering Multimedia Over Home Area Networks;" and U.S. Provisional Application Ser. No. 60/313,228 filed Aug. 17, 2001, entitled "Web Services Provisioning Architecture."

BACKGROUND OF THE INVENTION

1. Field of the Invention

The present invention generally relates to digital recording and playback systems and methods. More particularly, the present invention relates to improvements in delivery options for multiple users in a centralized home or other system—especially as relates to "live-pause," or "elastic" recording and playback.

2. Background

Digital Video Recording and Playback systems are becoming more commonplace with the advances in technology and the downward trend in prices. Along with a playback quality that is superior to analog-based systems, Digital Video Recorders (DVRs) also allow other features that are not practical with analog-based systems. Among such features is the ability of a DVR user to engage in "live-pause" recording and playback.

Also known as "elastic" recording and playback, live-pause recording and playback allows a viewer/user with such an enabled system to watch a program live in real time while the program is being recorded, while also allowing the user to use "trick play" modes or functions such as pausing the program or rewinding the program. While the recorded program is being paused or rewound, the system continues to record the program in a buffer memory. The system keeps track of where in memory the user has exited to perform trick play functions. The user can later return to the previous point of viewing in the program or skip with a "fast forward" operation up to the most current point of recording. Live-pause recording and playback allows the user the flexibility of watching a program live, already recorded, or a combination of both live and recorded viewing, along with interesting trick play modes.

While the recent development of DVRs has been considerable for individual monitors and television systems, the inclusion and practical use of such devices has not been optimized for home area networks and the like, in the same manner that other services such as telephone and the Internet are delivered.

It is therefore desirable—but non-existent in the prior art—to provide a home area networked multimedia system that allows the efficient and simultaneous viewing and reproduction of digital video programs from multiple televisions sets (or other similar devices) on the same premises, from a centralized source.

SUMMARY OF THE INVENTION

In view of the aforementioned problems and deficiencies of the prior art, the present invention provides a method of digital video program reproduction within defined premises. The method at least includes the steps of receiving a plurality of electronic audio-visual programs, storing the programs in memory, and providing a plurality of program reproduction devices adapted to reproduce programs for viewers/users. The method also at least includes the steps of networking the memory and the program reproduction devices, selecting a program ("selected program"), and distributing the ability to control reproduction of the selected program among two or more reproduction devices so that, at the selection of a viewer, the reproduction of the selected program is seamless between the reproduction devices.

The present invention also provides a system for digital video program reproduction within defined premises. The system at least includes a program receiver adapted to receive a plurality of electronic audio-visual programs, memory adapted to store the programs, a plurality of program reproduction devices adapted to reproduce programs for viewers/users, and a network adapted to network the memory and the program reproduction devices. The ability to control reproduction of a selected program among two or more reproduction devices is distributed so that, at the selection of a viewer, the reproduction of the selected program is seamless between the reproduction devices.

BRIEF DESCRIPTION OF THE DRAWING FIGURES

Figure 3:
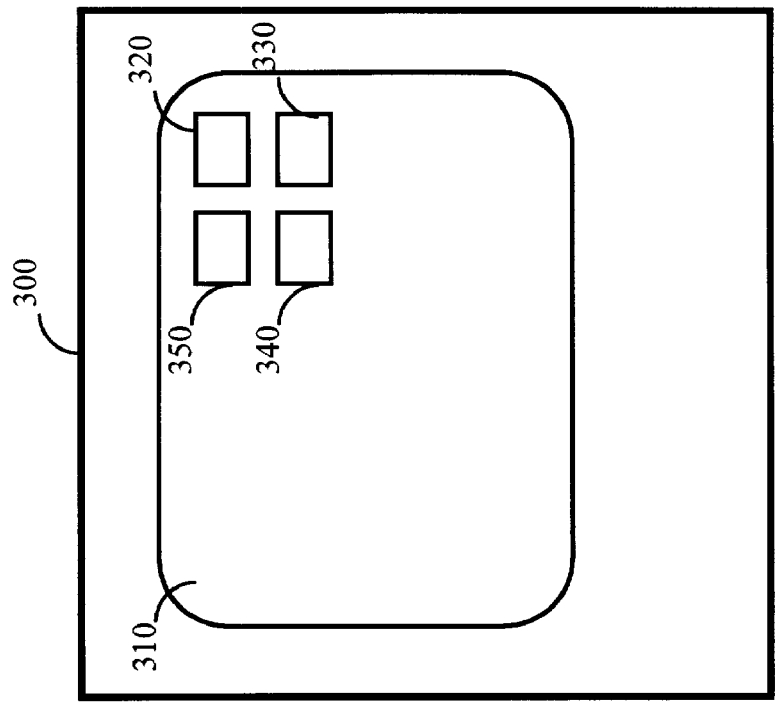
Figure 2:
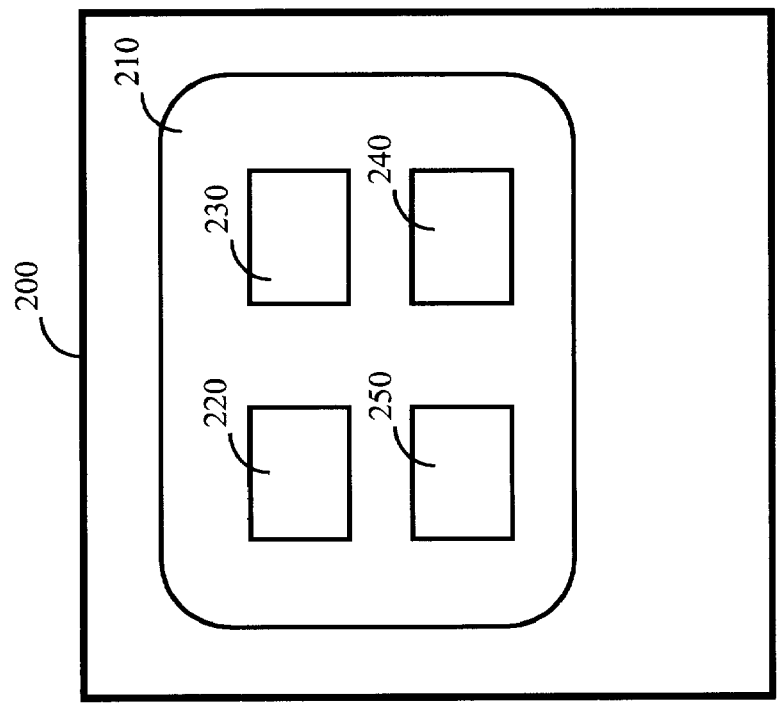

Features and advantages of the present invention will become apparent to those skilled in the art from the description below, with reference to the following drawing figures, in which:

FIG. 1 is a schematic block diagram of the present-inventive home area-networked digital video recording and playback system; and FIGS. 2 and 3 are examples of monitors in the present-inventive system displaying multiple programs in picture-in-picture mode.

DESCRIPTION OF THE PREFERRED EMBODIMENTS

General Description

The present-inventive home area-networked digital video recording and playback system 100 is explained below with reference to FIG. 1. In its elementary form, the system 100 combines a server 140 for receiving and storing multiple electronic audio-visual programs (e.g., digital or analog television broadcasts, and video recordings such as those provided by video-on-demand services), and several reproduction devices such as digital or analog television sets (124, 128 and 132) via a home area network 120. The server 140 acts as the Digital Video Recorder.

The home area network 120 is a computer bus adapted for both digital communication and the transport of digital video and digital audio multimedia content compatible with digital television receivers. Those skilled in the art will appreciate that there are a number of bus standards that can be employed without departing from the scope of the present invention.

Newer-design television sets can connect directly to the home area network via video bus cable jacks, or via wireless transceivers connected to the video bus jacks. Television sets with older designs can connect to the home area network via converters, ideally in the form of set-top boxes. In the preferred embodiment, the set-top boxes subsume the units 122, 126 and 130. The units 122, 126 and 130 are responsible for decoding and decrypting digital program signals from the server 140, as well as rendering the decoded and decrypted signals compatible for display with the television receivers 124, 128 and 132.

A program guide service 104 obtains information used by the system to construct an electronic program guide (EPG) to present details about programs to the system and to viewers in the form of a graphical user interface. In the preferred embodiment, the program guide service 104 obtains programming information via a broadband or wide area network (WAN) connection 102 to a host computer (not shown). Those skilled in the art will appreciate that the programming information can be obtained through other types of connections, such as, inter alia, a cable MODEM, xDSL, POTS MODEM, satellite, and fixed terrestrial wireless.

For programs to be viewed and reproduced by the system 100, the program guide service provides information such as the program name, start and end times, channel designation, and additional information about the program such as the program rating, and a program synopsis. In an alternative system, the program guide information can be delivered in a different manner, such as in the video program steam as is known in the art. That is, along with the other audio and video information representing a television channel, for example, headers and other program description information can be included (e.g., program description information can be inserted in the vertical blanking interval of an NTSC television signal).

Via inputs 106 and 110, the system 100 also receives digital and analog television program signals, respectively, to be processed by tuner and demodulator circuits 108 and 112. The tuner and demodulator circuits have the function of tuning into program channels selected to be received by the system 100 and then demodulating them in a manner known in the art.

The analog content signal need not initially be in a modulated form, as in the example, but may be unmodulated, in which case the tuning and demodulation circuit 112 is bypassed. Such an unmodulated analog content signal may be coupled to the system 100 via an "S-video" jack. Similarly, the digital content signal can be received either in a modulated form, or an unmodulated form (such as a straight ATSC stream), which for the latter case, the tuning and demodulation circuit 108 is bypassed.

The television signals and other program signals are stored in memory 118 in a predefined manner or as dictated by a user from one of the receivers (124, 128, 132). In the preferred embodiment, the memory 118 is a high-capacity hard disk drive, although other forms of memory systems are compatible. The writing of program content information to memory and the reading of program content information from memory are controlled by a video manager 116.

Prior to storage in memory, the analog program signals from the tuning and demodulating circuit 112 are digitized and then encoded using a digital compression scheme such as those established by the Motion Picture Experts Group (MPEG). These include the MPEG-2, MPEG-4 and other standards. In the preferred embodiment, the program signals are stored as Elementary Streams, as will be familiar to those skilled in the art. Where appropriate, the digital program signals are decoded and re-encrypted by the circuit 142 prior to storage as an Elementary Stream in the memory 118. The exact point of decryption in the system is a matter of design choice dictated by such factors as the legal requirements and restrictions of the content providers who broadcast the program signals. These requirements and restrictions relate to preventing unauthorized access and copying of programs. Where allowable, the circuit 142 can decrypt and then re-encrypt program streams using Public Key Encryption (PKE) so that the receivers 124, 128 and 132 need not contain substantial hardware and/or software complexities.

The communication and transport of program information between the server 140 and the various user control and reproduction devices (or client devices, or receivers) can be via a number of network and streaming protocols, including, inter alia: Real-Time Transport Protocol (RTP); Real-Time Streaming Protocol (RTSP); Transmission Control Protocol Protocol (TCP); User Datagram Protocol (UDP); Network File System (NFS) Protocol; Web-Distributed Authoring and Versioning (WebDAV) Protocol; Server Message Block (SMB) Protocol; IEEE 1394 Protocol; and Internet Small Computer System Interface (iSCSI) Protocol.

The system users communicate with the server 140 via a user interface 134, which converts user commands to commands compatible with the server 140. Those skilled in the art will appreciate that the server can be structured differently from that illustrated, and can include more or fewer of the components in FIG. 1. The most important aspect of the server is that it is a centrally located means for storing multiple programs which are readily and contemporaneously accessible by, and readily and contemporaneously controlled by multiple local client devices via a home area network.

The home area network 120 can be administered using many suitable access and conflict resolution schemes for managing the flow of information between the server 140 and the several receivers 124, 128, and 132, without departing from the scope of the present invention. For example, older Ethernet approaches using token rings will suffice. However, it will be appreciated by those skilled in the art that later Ethernet approaches such as the 10/100BaseT UTP (Universal Twisted Pair) utilizing Carrier Sense Multiple Access (CSMA) with Collision Detect (CSMA/CD) will also suffice. Using the latter approach, a station/receiver desiring to transmit information seeks a free carrier line. When a free line is obtained, the station/receiver begins transmitting while simultaneously checking for collisions with other stations/receivers attempting to use the same carrier line. If a collision is detected, transmission halts and the station/receiver releases the carrier line for a random or pseudo-random amount of time until the carrier line appears to be free, after which, retransmission is attempted.

Still other approaches such as Carrier Sense Multiple Access with Collision Avoidance (CSMA/CA) can be used. Examples of networks using the CSMA/CA scheme include the 802.11a and 802.11b Wireless Networks. Instead of attempting to detect collisions, the networked wireless devices look for an available transmission band, and then transmit after a random or pseudo-random amount of time. If an acknowledgment signal (ACK) is received within an expected window, the devices assume that no collision has occurred. If an ACK signal has not been timely received, the devices assume there has been a conflict with another device, and then attempt to retransmit the information.

Yet other approaches (e.g., Hiperian/2 and bluetooth wireless, and IEEE 1394 wired) include those employing a Time Division Multiple Access (TDMA) scheme. The stations/receivers can transmit during fixed designated time slots, or in the case of schemes such as IEEE 1394, during a guaranteed, but variably located time slot.

System Operation

In operation, a viewer can retrieve programming from the server from any of the networked receivers. The same program can be watched simultaneously by more than one receiver if desired. Further, live-pause control and playback can be executed from any networked receiver, allowing a program to be viewed in the live-pause mode in a seamless manner from more than one receiver. For example, a program being viewed on one receiver can be paused. Later, the same program can be resumed from the same pause point and viewed, but from a different receiver.

Therefore, both the viewing and control of programming can be distributed among multiple receivers in a seamless manner if desired. It should be appreciated by those skilled in the art that all trick play modes can be distributed across multiple receivers for a single program as described above with respect to the "pause" mode. For example, a viewer who has previously paused or rewound a program being recorded in live-pause mode can decide to "fast forward" to another point using one receiver, and then resume viewing from the stopping point (of the fast forward operation) using another receiver.

The system 100 is also capable of other special reproduction modes by virtue of the receivers 124, 128 and 132 having access to multiple programs via the server 140. For example, a viewer can display multiple picture-in-picture miniature displays, each representing a different program at the same time. This is illustrated in FIGS. 2 and 3. In FIG. 2, a receiver 200 can simultaneously access multiple programs from the server 140 and display them on the display 210 as several picture-in-picture images 220, 230, 240 and 250.

The picture-in-picture images can be spread out over the display, or confined to a small region as shown in FIG. 3. In FIG. 3, the elements 300, 310, 320, 330, 340 and 350 correspond to FIG. 2 elements 200, 210, 220, 230, 240 and 250, respectively. It should be appreciated by those skilled in the art that other types of picture-in-picture displays are possible with the present invention.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of digital video program reproduction within defined premises, said method comprising:
   receiving a plurality of electronic audio-visual programs;
   storing said programs in a centralized memory;
   providing a first program reproduction device and a second reproduction device adapted to reproduce programs for viewers/users;
   networking said centralized memory and said first and second program reproduction devices together;
   selecting a program as a selected program;
   distributing the ability to control reproduction of said selected program among the first and second reproduction devices so that, at the selection of a viewer, said reproduction of said selected program is seamless between said reproduction devices such that the first reproduction device may live-pause the reproduction of the selected program and the second reproduction device may resume reproduction of the selected program;
   designating as part of a hierarchy, a control ranking to each of said first and second reproduction devices; and
   during control conflicts, allowing the reproduction device attempting to control playback having the highest control ranking, to control the reproduction of said selected program.

2. The method in claim 1, wherein first and second reproduction devices contemporaneously display said selected program.

3. The method in claim 1, further comprising:
   designating the first reproduction device as a master device;
   designating the second reproduction device as a slave device; and
   during control conflicts involving the master device and the slave device, allowing the master reproduction device to control playback of said selected program.

4. The method in claim 1, further comprising:
   viewing a selected program via a first reproduction device;
   establishing a pause point;
   pausing the playback of said selected program via said first reproduction device; and
   resuming the playback of said selected program via the second reproduction device from said pause point.

5. The method in claim 1 wherein the first and second reproduction devices are capable of reproducing a selected program independently.

6. A system for digital video program reproduction within defined premises, said system comprising:
   a program receiver adapted to receive a plurality of electronic audio-visual programs;
   a central memory adapted to store said programs;
   a first program reproduction device and a second program reproduction device each adapted to reproduce programs for viewers/users; and
   a network adapted to network said central memory and said first and second program reproduction devices; wherein the ability to control live-pause reproduction of a selected program among the first and second reproduction devices is distributed so that, at the selection of a viewer, said live-pause reproduction of said selected program is seamless between said first and second reproduction devices,
   wherein each of said first and second reproduction devices are designated to have, as part of a hierarchy, a control ranking, and during control conflicts, the reproduction device attempting to control playback having the highest control ranking, controls the reproduction of said selected program.

7. The system in claim 6, wherein said central memory is part of a server.

8. The system in claim 6, wherein said first and second reproduction devices contemporaneously display said selected program.

9. The system in claim 6, wherein the first reproduction device is designated as a "master device," and the second reproduction device is designated as "slave devices," and during control conflicts involving the master device and slave devices, the master reproduction device controls playback of said selected program.

10. The system in claim 6, wherein said system is adapted to allow viewing a selected program via the first reproduction device, establish a pause point, pause the playback of said selected program via said first reproduction device, and resume the playback of said selected program via the second reproduction device from said pause point.

11. The system in claim 6 wherein the first and second reproduction devices are adapted to reproduce a selected program independently.

* * * * *